United States Patent [19]
Castillo

[11] Patent Number: 4,669,184
[45] Date of Patent: Jun. 2, 1987

[54] BUILDING TRUSS FABRICATION APPARATUS

[75] Inventor: Adolfo Castillo, Miami, Fla.

[73] Assignee: Gang-Nail Systems, Miami, Fla.

[21] Appl. No.: 665,958

[22] Filed: Oct. 29, 1984

[51] Int. Cl.⁴ .......... B23P 19/00
[52] U.S. Cl. .......... 29/798; 29/432; 100/35; 100/224; 100/229 R; 100/913; 269/236
[58] Field of Search .......... 29/155 R, 432, 772, 29/798, 799; 100/193, 913, 229 R, 224, 35; 269/236

[56] References Cited

U.S. PATENT DOCUMENTS

| | | | |
|---|---|---|---|
| 3,238,867 | 3/1966 | Jureit et al. | 269/236 X |
| 3,520,252 | 7/1970 | Jureit et al. | 100/913 X |
| 3,602,237 | 8/1971 | Jureit | 100/913 X |
| 3,709,762 | 1/1973 | Chandler | 100/913 X |
| 4,068,577 | 1/1978 | Murphy | 100/229 R X |
| 4,366,020 | 12/1982 | Overlack | 100/224 X |

*Primary Examiner*—Charlie T. Moon
*Attorney, Agent, or Firm*—Lowe, Price, LeBlanc, Becker & Shur

[57] ABSTRACT

A building truss fabrication apparatus in which a plurality of press head assemblies are supported by an overhead gantry support so that the various press assemblies are movable in an x-y coordinate space. A movable jig table is arranged to move between an assembly position and a pressing position within the apparatus. The movement of the jig table is hydraulically powered as are the press head assemblies. The entire apparatus is operable by a single hydraulic power source. A standard air compressor is used to generate air pressure of pneumatic clamps used on the jig table. The pneumatic clamps are part of the jig fixtures which hold lumber components into a truss preformed shape. Connector plates or nail plates are pressed into the component ends by the press head assemblies in order to complete fabrication of the building truss.

22 Claims, 11 Drawing Figures

BUILDING TRUSS FABRICATION APPARATUS

TECHNICAL FIELD

The present application relates to a fabrication apparatus for interconnecting assembled components of a building truss with connector or nail plates. Building trusses are manufactured by use of such presses in the building industry particularly for residential and mobile home roof construction.

BACKGROUND OF THE INVENTION

Press apparatuses for assembling building trusses from arranged components have generally included a layout or work table upon which the components are assembled and held in place by jig fixtures and a press mechanism which has involved the use of one or more hammers or pressure plates which drive the nail plates in to the truss components. When the nail plates have been driven into the assembled components a truss joint is formed. When all of the required truss joints have been secured by nail plates or connector plates the completed building truss is removed from the work table.

U.S. Pat. No. 3,172,125 to Sanford shows a truss fabricating apparatus with five stamping stations which are separated to provide work bays. The stamping stations contain hydraulic cylinders and hammers which can be positioned over individual truss joints for pressing in a connector plate. The truss components are arranged by a hand layout operation within the stamping stations and after fabrication the truss is removed by a roller conveyor which forms part of the stamping stations. Personnel working on such a truss fabricating apparatus must work between, under and around the press stations during fabrication.

U.S. Pat. No. 3,379,354 to Moehlenpah et al shows an assembly work station with a single C-shaped hydraulic press which is movable to various individual component joints in order to drive in the connector plates.

U.S. Pat. Re. No. 27,692 to Post shows an assembly apparatus in which a series of base supports are used to mount upstanding C-clamp stands. In use, the operating personnel must adjust the clamp stands on the supporting base supports and then place the truss components into the stands under the C-clamp presses one component at a time prior to securing the joints with connector plates. U.S. Pat. Nos. 3,771,439 to Mort and 3,388.65 to Jureit show truss assembly apparatus similar to that shown in Post.

U.S. Pat. No. 3,826,188 to Eberle, shows a truss fabricating machine which has a frame on which hydraulic cylinders and platens are mounted. This type of press machine requires movement of the frame along the work table and adjustment of the hammers at each station in order to drive in the individual connector plates. U.S. Pat. No. 4,441,643 shows a similar apparatus for the fabrication of loading pallets.

U.S. Pat. No. 3,329,328 to Jureit et al shows a truss fabricating apparatus in which a series of fixed C-frame clamps are employed for manufacturing a bow string truss. This apparatus does not have variability sufficient to produce other trusses such as monopitch trusses.

U.S. Pat. No. 3,334,580 to Smith, shows an early form of a truss fabricating apparatus in which a carriage operated a single drop hammer to drive connector plates into truss joints.

U.S. Pat. No. 3,443,513 to Jureit et al, shows an elongated conveyor work table which is outfitted with a single press 12 under which the truss to be formed is moved for a series of connector plate assembly steps. U.S. Pat. Nos. 3,602,237, 3,603,244 both to Jureit et al and 4,104,962 to Castillo are similar in regard to the use of a single press station.

Other patents dealing with truss fabrication apparatus are: U.S. Pat. Nos. 4,241,651; 4,081,120; and 4,184,621.

The prior art as represented by the above mentioned patents required operators to assemble the truss components in and around and under various press heads and hammers. Such a manufacturing process is characterized by a high labor cost component since individual placement of the components must be made in and around a number of pressing heads which have to be accessed by the operator who must then move between various work stations and pressing stations. The alternative is to employ multiple personnel which also raises the labor costs.

The prior art presses are also characterized by requiring the operators to move the hammers or press plates to multiple locations on each truss during the fabrication process. This results in high unit production costs due to operator time expenditure.

The fabrication of building trusses is becoming a highly cost competitive manufacturing business. Lower unit production costs are required which then forces higher productivity and low labor costs for the truss fabrication process.

Another cost element in the truss fabrication business is that operator safety is of particular concern with respect to plant operating insurance policies and OSHA (Occupational Health and Safety Adminstration) regulations.

The evolving requirements for truss fabrication apparatus and the manufacturing process carried out thereby require improvements for higher productivity and hence lower unit production costs.

The present invention solves the above problems in the prior truss fabrication apparatus by providing a jig table upon which the truss components can be assembled in a secured truss formation together with connector plates without the necessity for the operator to work in and around the press platens which drive the connector plates into the components. The jig table is then power driven to a position under a gantry press system which is easily adjustable to accomodate different pressing positions for the fabrication of a wide range of building truss. After fabrication the building truss is quickly and conveniently removed from the truss press.

By use of the truss press of the present invention higher productivity and lower unit production costs for building truss is possible. Safety of operation is also assured.

SUMMARY OF THE INVENTION

A building truss fabrication apparatus is provided in which a plurality of press head assemblies are supported by an overhead gantry bridge so that the various press assemblies are movable in an x-y coordinate plane. Separate press assemblies are provided for each connector plate. A movable jig table is supported on a base adjacent to the front opening of the gantry press assembly for moving assembled truss components into pressing position and for removing the completed truss without the necessity for the operator to work in and around the press assemblies.

The movement of the jig table is powered by a hydraulic drive assembly and the press heads are also operated by a hydraulic power unit. Thus, the entire building truss apparatus is operated by a single hydraulic power source.

It is therefore an object of the present invention to provide a building truss apparatus which has an overhead press platen assembly for driving connector plates into assembled truss components for fabrication of building truss.

Another object of the present invention is to provide a movable jig table upon which building components can be arranged for movement into a pressing position under a gantry press assembly.

Yet another object of the present invention is to provide a building truss press in which the assembled truss components can be moved into and out of pressing position on a movable jig table.

Yet another object of the present invention is to provide a process for manufacturing building truss in which the truss components are assembled on a movable jig table which is then moved into pressing position, fabrication of the truss is completed by driving connector plates into the components and moving the completed truss out of pressing position on the jig table.

These and other objects of the present invention will be apparent from the following description of the drawings.

DETAILED DESCRIPTION OF THE PREFERRED EMBODIMENTS

Figure 1:
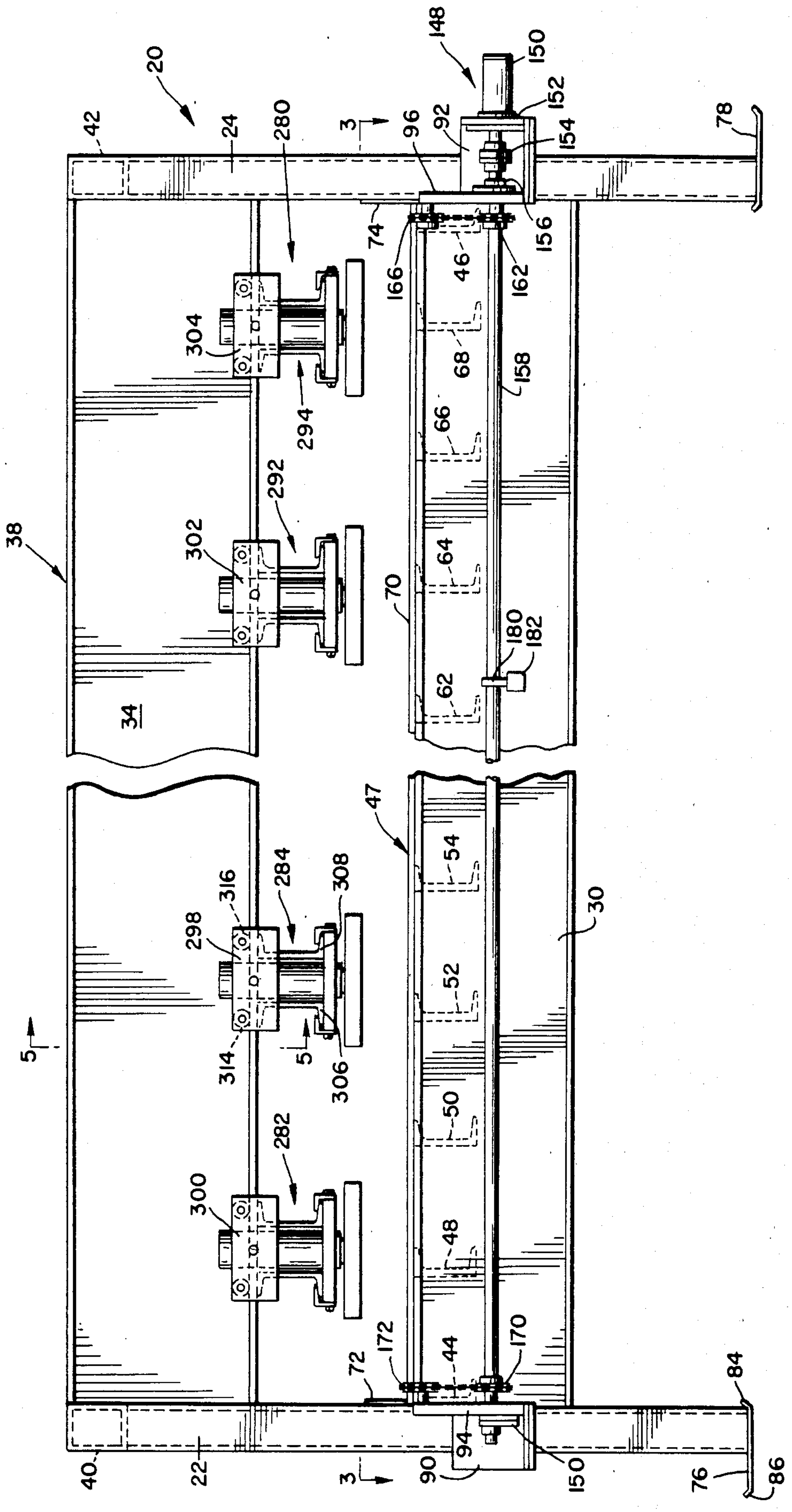
FIG. 1 is a front elevation view of the building truss apparatus of the present invention without the jig base and table connected thereto.

The building truss fabrication apparatus 20 shown in FIGS. 1-11 is constructed with four corner vertical tube frames 22, 24, 26 and 28 which are joined by elongated channel frame members 30 and 32 arranged between the front pair of tubes 22 and 24 and the rear pair of tubes 26 and 28 at a table-height position. Upper channel frame members 34 and 36 are connected at a higher position between the front pair of tube frames 22 and 24 and the rear pair of tube frames 26 and 28, respectively. These upper two channel frame members 34 and 36 form a gantry bridge 38.

The gantry bridge 38 is also formed by side frame tubes 40 and 42 which are connected between the upper ends of tube frames 22 and 26 via tube frame 40 and the vertical tube frames 24 and 28 via the tube frame 42, respectively. Tube frames 40 and 42 are located at the upper portions of the gantry channel members 34 and 36.

Figure 3:
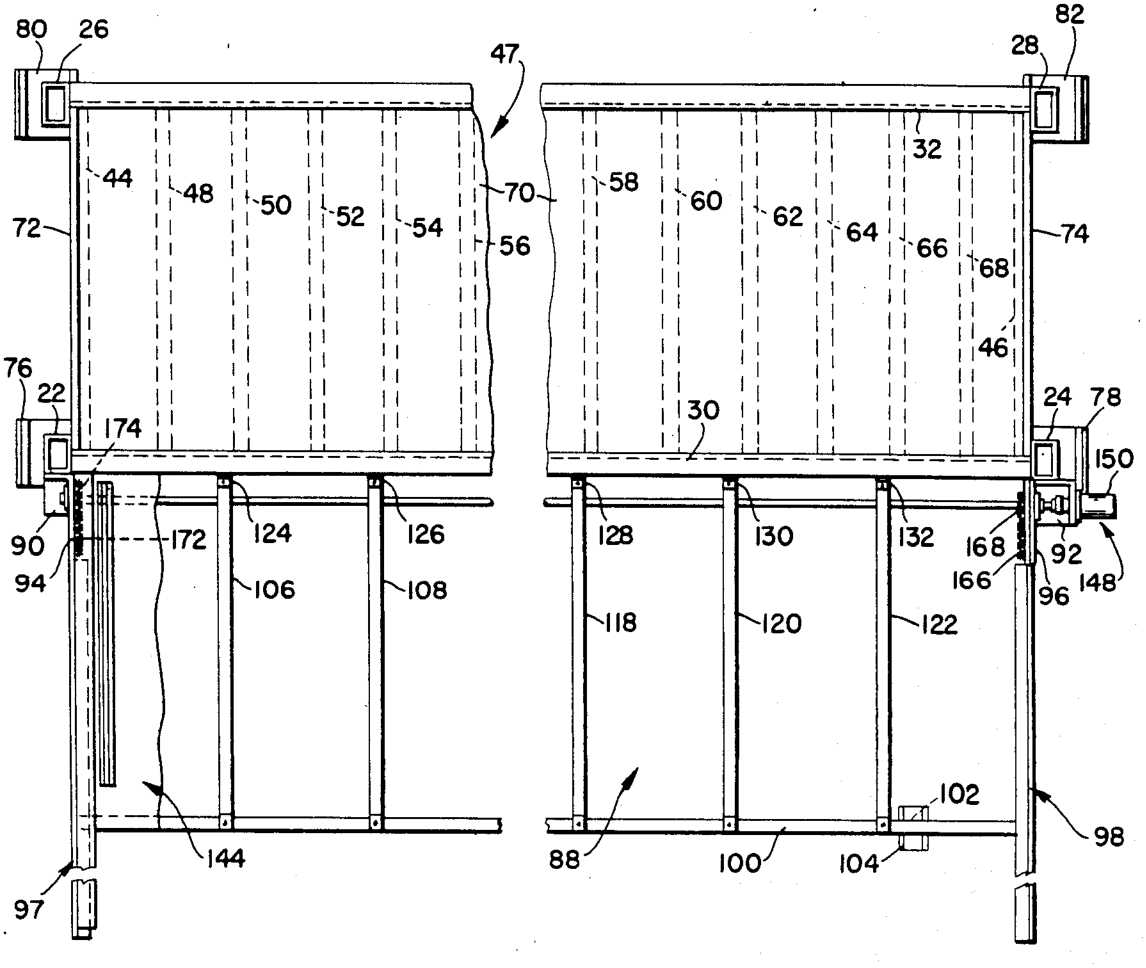
FIG. 3 is a cross-sectional view of the truss apparatus taken on line 3—3 of FIG. 1 and shows the base frame, and the jig base and table.
Figure 4:
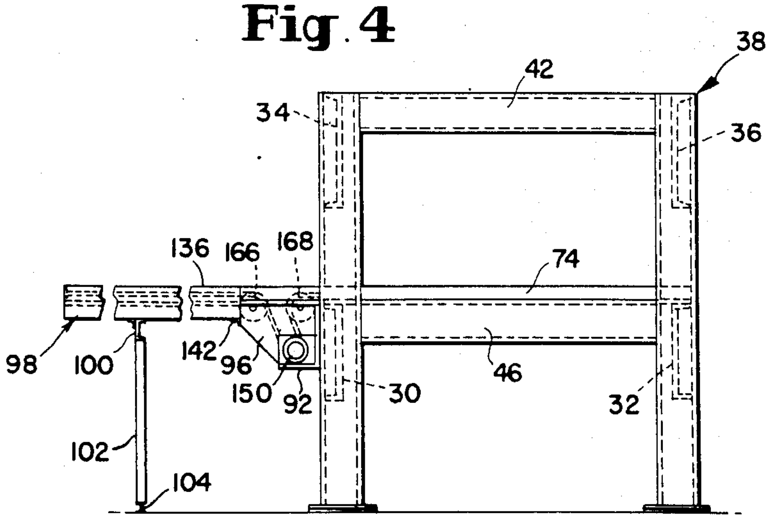
FIG. 4 is an end elevation view of the truss apparatus shown in FIG. 2.

Corresponding lower positioned side channel frames 44 and 46 are constructed between the front and rear vertical tube frames at the table-height position of the upper portion of the frame channel members 30 and 32 as shown in FIG. 4. A lower platen support 47 is then constructed at the table-height of frame members 30, 32, 44 and 46 by placing a series of frame channel members between the front channel member 30 and the rear channel member 32. These platen support channel members are illustrated as channels 48-68 in FIG. 3. The lower platen support 47 is completed by a platen plate 70 which is supported by the entire group of channel members at the table-height position illustrated by channels 44-68. Side plates 72 and 74 are positioned at both ends of the platen plate 70 adjacent to the front and rear vertical frame tubes 22 and 26 on the lefthand side and 24 and 28 on the righthand side as shown in FIG. 4.

Foot pads 76 and 78 are provided for the front vertical tube frames 22 and 24 and rear foot pads 80 and 82 are provided for rear tube frames 26 and 28. The foot pads 76-82 are provided with upturned outer side edges in a front to rear direction as shown by edges 84 and 86 of foot pad 76. The foot pads provide for skidding adjustments for positioning of the apparatus 20 within shop areas.

Figure 2:
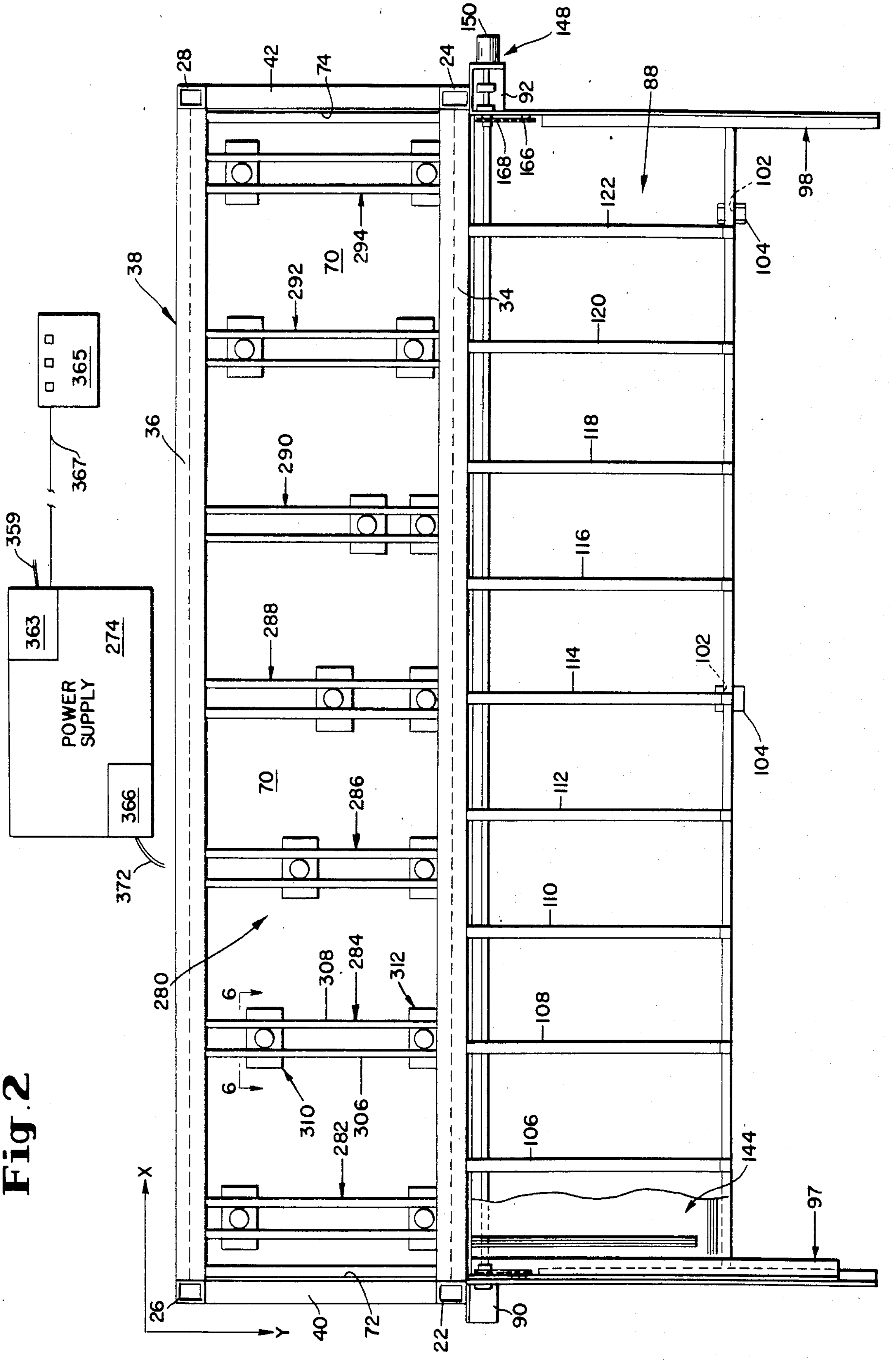
FIG. 2 is a top plan view of the truss apparatus of FIG. 1 showing the jig base and movable jig table connected to the press apparatus.

As best shown in FIG. 2, a jig base 88 is attached to the front pair of vertical tube frames 22 and 24 and to the front channel member 30. Mounting brackets 90 and 92 are attached to the front surfaces of vertical tube frames 22 and 24, respectively, at a position intermediate the vertical height of the front channel member 30 as shown in FIG. 1. Both of these brackets are formed with support plates 94 and 96, respectively, which extend outwardly in front of the respective vertical frame tubes for attachment of jig rest tube and guide assemblies 97 and 98, respectively. These two assemblies 97 and 98 are attached by rear portions to the support plates 94 and 96 which can be seen in FIGS. 1 and 3. The front portion of the jig base assembly 88 is then supported by a transverse channel 100 which is in turn supported on a series of support legs 102 which are spaced transversely under the channel 100. An adjustable foot pad 104 is also provided for each of these support legs. Three such legs are sufficient across the width of the jig base assembly 88.

A series of support struts 106, 108, 110, 112, 114, 116, 118, 120 and 122 are secured to the top side of channel 100 and to a series of brackets 124-132 as shown in FIG. 3 which are attached to the transverse front channel member 30. The attachment brackets 124-132 permit pivotal adjustment consistent with adjustment of foot pads 104.

Figure 10:
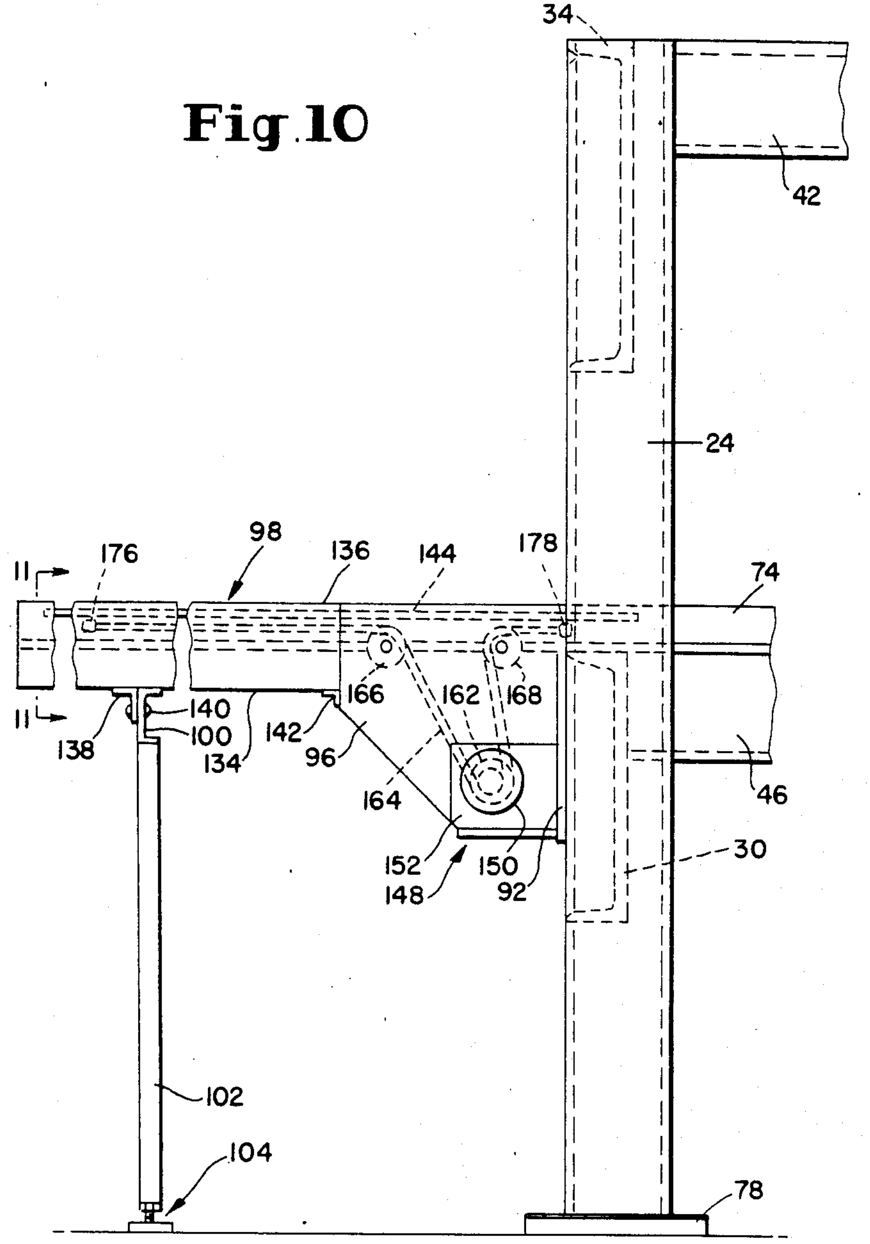
FIG. 10 is an enlarged fragmentary end view of the apparatus shown in FIG. 2 and shows the movable jig table drive means.
Figure 11:
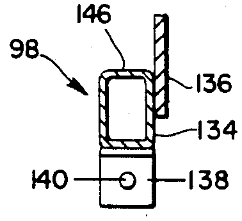
FIG. 11 is a cross-sectional view of the rest tube and guide assembly of the jig base taken on line 11—11 of FIG. 10.

Each of the rest tube and guide assemblies 97 and 98 are formed by a tubular rest member 134 and a vertically attached support plate 136 as shown in FIG. 11. The rear edge of support plate 136 is secured to the front edge of the respective support plates 94 and 96 as shown in FIG. 4 and 10. An attachment bracket 138 is also provided on the rest tube and guide assemblies for attachment to the transverse channel member 100 by fasteners shown as bolts 140 in FIG. 10. A reenforcing angle bracket 142 can be provided between the under surface of rest tube 134 and the support plate 96 as shown in FIG. 10. The lower surface of the rest tubes 134 of the rest tube and guide assemblies 97 and 98 is supported by transverse channel member 100 which also provides support and attachment for the support members 106–122 shown in FIGS. 2 and 3.

A slidable jig table 144 is arranged for reciprocal movement on the jig base assembly 88 between the guide bars 136 as shown in FIGS. 10 and 11. The rest tube and guide assembly 98 also shown in these two figures is of course modified by placement of the guide bar on the lefthand side of rest tube 134 when constructing the lefthand rest tube and guide assembly 96.

The slidable jig table 144 rests on the top surfaces illustrated by surface 146, of rest tube 134 in FIG. 11. The bottom surfaces of the jig table 144 is also supported by the support members 106–122 shown in FIGS. 2 and 3. Movement of jig table 144 from the position shown in FIGS. 2 and 3 to a position contiguous with and immediately above the bottom platen 70 is effected by a jig mechanization assembly 148 which consists of a hydraulic motor 150 which is attached to mounting bracket 92 by a hydraulic motor and sprocket mounting bracket 152.

A flexible coupling 154 is provided for transmitting rotary power from motor 150 through a drive shaft 158 which is supported in a flange bearing 156 on the righthand side and by a journal bearing 160 on the righthand side of apparatus 20. Flange bearing 156 is attached to mounting plate 96 and journal bearing 160 is attached to mounting plate 94 on the lefthand side. A drive sprocket gear 162 is attached to drive shaft 158 as shown in FIGS. 1 and 10. A sprocket drive chain 164 is powered by sprocket 162 and is positioned immediately under slideable jig table 144 by a front and rear idler gears 166 and 168 on the righthand side of apparatus 20 as shown in FIG. 10. A drive sprocket gear 170 is attached to drive shaft 158 on the lefthand side of apparatus 20 for operating a matching drive sprocket chain (not shown) which is supported by front and rear idler gears 172 and 174 as shown in FIG. 3.

The terminal portions of the drive sprocket chains are attached to studs on both undersides of table 144 illustrated by studs 176 and 178 for drive chain 164 in FIG. 10.

Drive shaft 158 is supported at several transverse positions between the flange bearing 156 and the journal bearing 160 by pillow blocks which are supported by mounting angles as illustrated by pillow block 180 and mounting angle 182 which is secured to the web of front channel member 30.

Jig Table Construction

Figure 9:
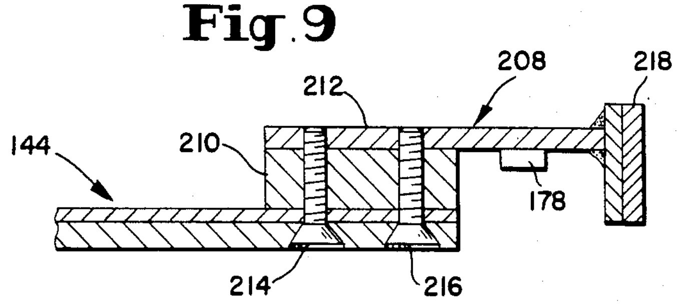
FIG. 9 is a cross-sectional view of the jig table support system taken on line 9—9 of FIG. 7.
Figure 7:
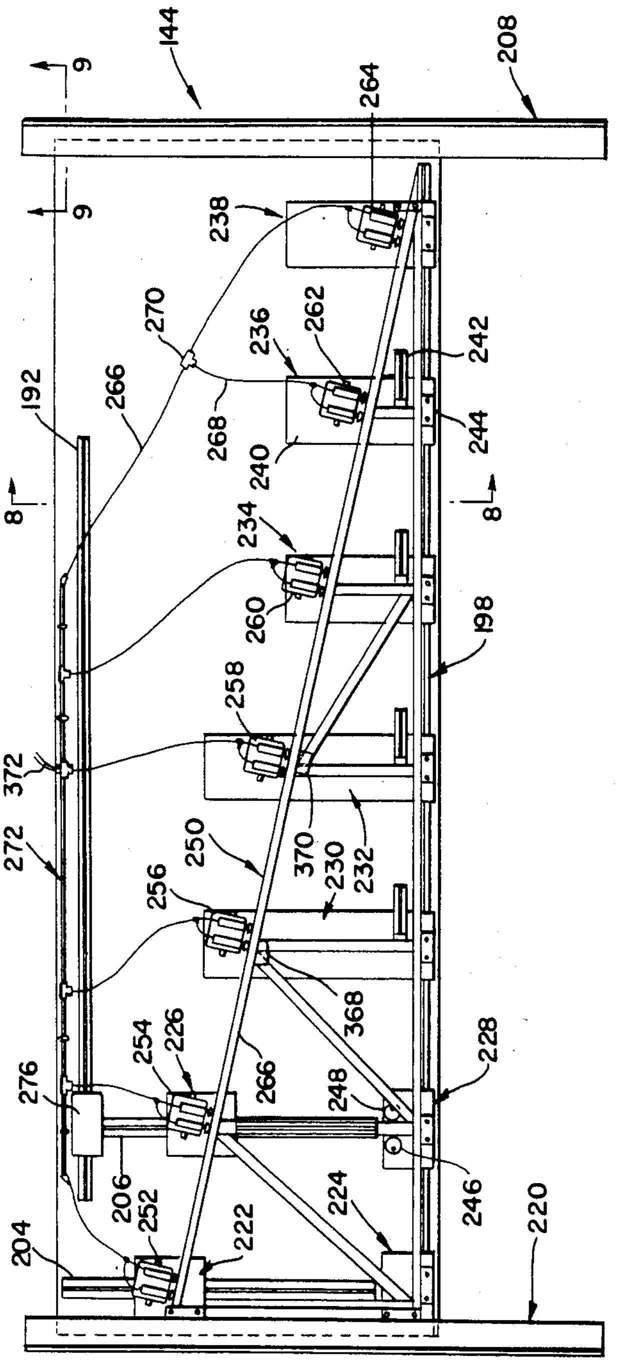
FIG. 7 is a detailed top plan view of the jig table together with the jig fixtures showing a monopitched truss arranged for fabrication.
Figure 8:
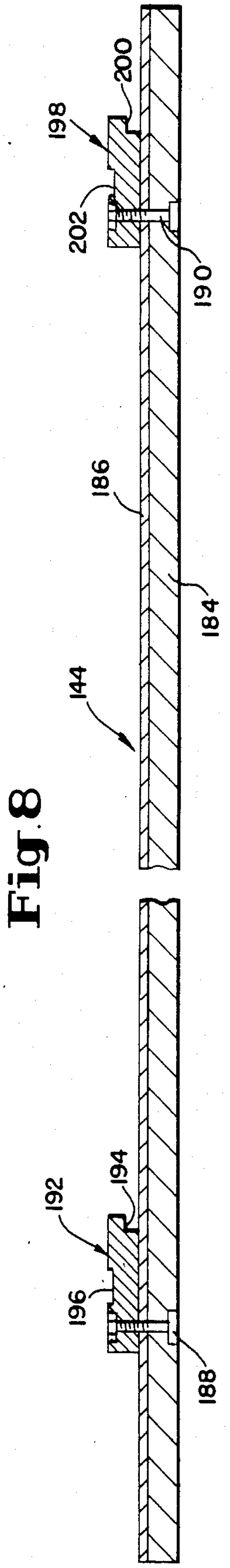
FIG. 8 is a cross-sectional view of the jig table of FIG. 7 taken on line 8—8.

As shown in FIGS. 7–9 jig table 144 is constructed with a plastic base plate 184 which can be fabricated from polypropylene, polybutylene, melamine-formaldehyde, polyester or like polymer materials. A steel sheet 186 is secured to the upper surface of plate 184 by adhesive and by the bolts for guide bars which are illustrated as bolts 188 and 190 in FIG. 8. The top guide bar 192 is formed with an undercut portion 194 and a keyway 196 in the upper surface. The lower guide bar 198 is formed with an undercut portion 200 in its lower edge and a slide-way 202 in its top face. A peak guide bar 204 is located from front to rear on the lefthand side of jig table 144 as shown in FIG. 7 and vertical guide bar 206 is positioned parallel to guide bar 204 as shown in FIG. 7. The cross-sections of guide bars 204 and 206 are similar to guide bars 192 and 198. The purpose of the guide bars is to permit attachment of jig fixtures to the jig table 144.

A righthand chain assembly member 208 is attached to jig table 144 as shown in FIGS. 7 and 9. This chain assembly is constructed with a spacer bar 210 which spaces a reciprocation plate 212 from the upper surface of jig table 144. Flat head screws 214 anq 216 provide attachment of the plate 212. Other such screws are distributed throughout the length of the spacer bar 210 as shown in FIG. 7. An end bar 218 is attached to the outer edge of reciprocal plate 212 to complete the construction of the righthand chain assembly. A similar but mirror image left chain assembly 220 is shown in FIG. 7. The drive sprocket chain attachment stub 178 is also shown in FIG. 9 affixed to the underside of plate 208.

Jig Fixtures

As seen in FIG. 7 a series of conventional Jig fixtures are arranged on the guide bars on the top surfaces of jig table 144. A peak reaction pad assembly 222 is shown fixed in position along peak guide bar 204. A left horizontal heel reaction pad assembly 224 is also shown attached to the lower guide bar 198 for coaction with the peak pad assembly 222 as well as with the jig fixtures arranged along the lower guide bar 198.

A vertical bar reaction pad assembly 226 is attached to vertical guide bar assembly 206. Immediately in front of pad 226 a central reaction pad assembly 228 is attached to the front guide bar 198. Two intermediate reaction pad assemblies 230 and 232 are attached to the front guide bar 198. Pad assemblies 230 and 232 are typically 10 inches by 36 inches in area. Three somewhat smaller reaction pad assemblies 234, 236 and 238 are also attached to front guide bar 198 at successive portions as shown in FIG. 7. Each of the reaction pad assemblies is formed with a base reaction pad such as pad 240 illustrated for reaction pad assembly 236. One or more adjustable jig fittings illustrated as 242 and one or more fixed supports illustrated as 244 are provided for each of the reaction pad assemblies 222–238. The central reaction pad assembly 228 is provided with a pair of eccentric adjustment fasteners 246 and 248.

The arrangement of jig fixtures shown in FIG. 7 is set up for illustrating the clamping of a monopitch truss 250 which is held in the jig fixtures by a series of gang operated pneumatic clamps 252–264. These pneumatic clamps force truss component 266 downwardly against the lower reaction pad support illustrated as 244 for reaction pad assembly 236. The pneumatic cylinders 252–264 are operated through air tubes illustrated as tubes 266 and 268 which can be interconnected by a tube tee junction 270 for branching. The air tubes are in turn connected to a pneumatic manifold assembly 272 which is in turn connected to an air tank 366 operated by the power supply 274.

A vertical bar adjustment assembly 276 is provided for operating along the top guide bar 192 in order to position the vertical guide bar 206 at different transverse positions across jig table 144. The pneumatic clamps 252–264 are adjustably mounted to their respective base reaction pads and hence can be moved in various directions to accommodate a wide range of trusses on jig table 144. The jig fixtures are thus adjustable into a wide variety of positions to permit the manufacturing of various trusses. If desired, other reaction pads and pneumatic clamping means can be employed in order to fabricate virtually any building truss on a slideable jig table of the type described with respect to jig table 144. The arrangement of jig fixtures on the table 144 permits the placement of connector plates at the positions where the components converge. All of these connector plates can then be pressed into the various components to form the truss joints at the same time by apparatus 20 as described below.

Gantry Press Assembly

A gantry press assembly 280 is suspended from the lower flanges of the front and rear channel members 34 and 36 of the gantry bridge 38. This press assembly consists of a series of 7 press trucks 282–294 as shown in FIG. 2. Each of the press trucks is formed by a bridge truck end 296 and 298 as illustrated for press truck 284 in FIG. 5. These bridge truck ends are also shown as ends 300, 302 and 304 for trucks 282, 292 and 294, respectively in FIG. 1. Two bridge channels are then secured between the front and rear bridge truck ends as shown by bridge channels 306 and 308 for press truck 284 in FIGS. 1 and 5.

Figure 5:
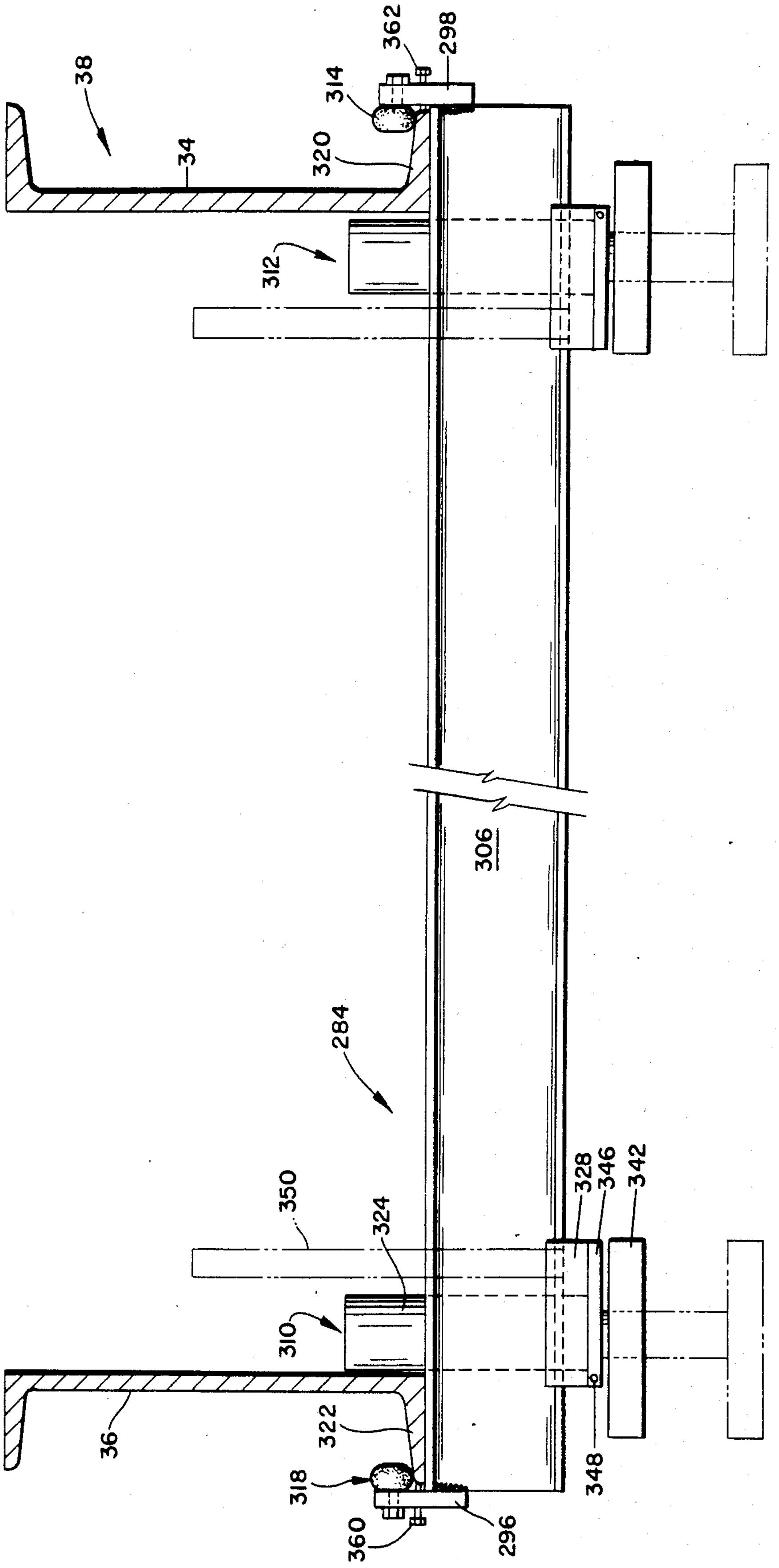
FIG. 5 is an enlarged cross-sectional view of the gantry bridge and two press assemblies taken on line 5—5 of FIG. 1.

Each of the seven press trucks 282–294 support two slideable press head assemblies 310 and 312 as shown in FIG. 5. The press trucks have a pair of roller wheels 314 and 316 mounted for rotation in the top portion of the bridge truck ends as shown for bridge truck end 298 in FIG. 5. A similar pair of roller wheels illustrated by wheel pair 318 attached to the rear truck end 296 are also provided. These roller wheel pairs permit movement of the press trucks transversely under the gantry bridge 38 from left to right as shown in FIG. 1. The roller wheel pairs contact the outer portion of the lower flanges 320 and 322 of the horizontal bridge channel members 34 and 36.

Figure 6:
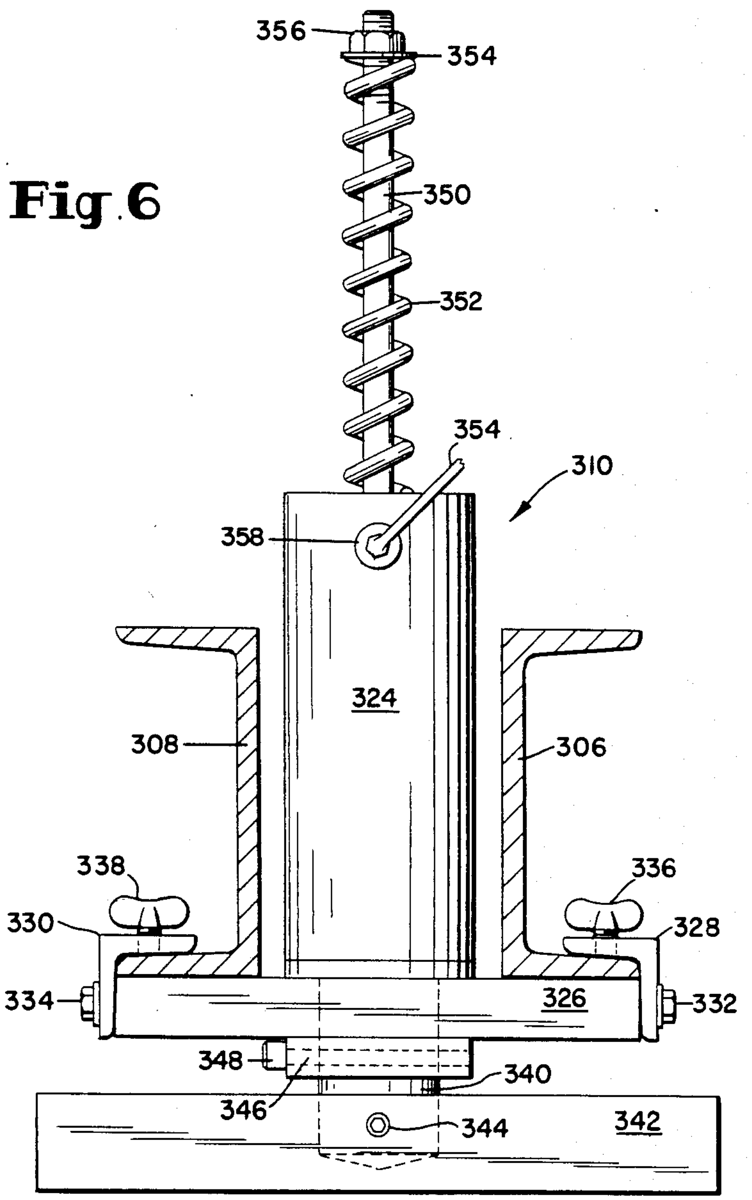
FIG. 6 is a detailed view of one of the press platens in the gantry assembly.

As shown in FIG. 6, each of the press head assemblies consists of an assembly 310 which is constructed with a hydraulic cylinder 324 mounted in a cylinder mounting plate 326 which is in turn secured by side gibs 328 and 330 attached by bolts 332 and 334, respectively. Thumb screws 336 and 338 are provided for securing the position of press head assembly 310 along the bridge channels 306 and 308 in the y-axis direction as shown in FIG. 2. The piston rod 340 of hydraulic cylinder 324 extends slidably through mounting plate 326 and is connected to an upper platen 342 via an Allenhead screw 344. A guide collar and stroke limiter block 346 is secured about the piston rod 340 by a socket head cap screw 348. A stud bolt 350 is connected to an extended end portion of block 346 which extends beyond the position occupied by the hydraulic cylinder 324. A return compression spring 352 is positioned about the stud bolt 350 and is secured at the top end by a flat washer 354 and a hex nut 356. Stud bolt 350 extends through mounting plate 326 for attachment to stroke limiter block 346 and the lower end of spring 352 rests on the upper surface of mounting plate 326. The connection port 358 for a hydraulic fluid line is shown on the upper portion of hydraulic cylinder 324.

Operation Of Press Head Assembly

Upon supplying hydraulic fluid into port 358 hydraulic cylinder 324 moves piston rod 340 downwardly so that upper platen 324 can contact a connector plate positioned for engagement with two or more truss component ends in order to form a truss joint by driving the connector plate into the component ends. During the operation of the hydraulic cylinder to cause the downward movement of upper platen 342 compression spring 352 compresses between the mounting plate 326 and the washer 354. Upon release of the hydraulic pressure in the line 359 connected to port 358 spring 352 returns the upper platen to its upper rest position as shown in FIG. 5. The compression springs of the press head assemblies 310 are located to the inside of the hydraulic cylinders. Also as seen in FIG. 5 hex head cap screws 360 and 362 are provided for the front and rear bridge truck ends 296 and 298 for securing the position of the press trucks transversely with relation to the gantry bridge 38 for securing truck positions in the x-axis direction. A valving and switching device 363 is provided in power supply 274 for supplying hydraulic fluid under pressure to the individual press head assemblies through the lines illustrated as line 359.

Adjustment Of Press Assembly 280

As can be understood from the foregoing description each of the 7 press trucks 280–294 support two press head assemblies and each of these trucks are movable transversely under the gantry bridge 38 so that an x-axis adjustment is provided for each of the trucks as shown in FIG. 2. Each of the two press head assemblies as illustrated by assemblies 310 and 312 for press truck 284 are adjustable in the y-axis direction in order to position the upper platens exactly over the connector plates which must be driven into the component ends in order to form a truss joint. Thus, the adjustment capabilities of the press assembly 280 provides for a full range of x- and y- coordinate axis movement for the upper platens. It is of course possible to increase the number of press trucks and press head assemblies or to decrease these as desired for the production of various building truss.

Once set up in the x-y coordinate area the press head assemblies permit the repetitive high efficiency manufacturing of given building truss. The adjustment of the press head assemblies and press trucks can be quickly made with simple hand tools for production of various building truss during a particular production shift.

Operation of Fabrication Apparatus

For operation of apparatus 20 the power supply 274 is set up to provide for hydraulic fluid under a predetermined pressure to each of the hydraulic ports 358 as shown in FIG. 6 for all of the hydraulic cylinders in the press assembly 280. A suitable conventional valving and switching device 363 is utilized to selectively operate all or part of the hydraulic power motor and cylinders for particular production runs. For example, a panel of remote control switches 365 can operate the bank of valves contained in device 363 as shown in FIG. 2 through a control line 367.

A pressurized air source 366 is also provided and is connected via an air line 372 to the air manifold assembly 272 of FIG. 7. Suitable conventional valving and switching arrangements (not shown) are utilized for operating the pneumatic clamps 252–264 during set up of the truss components into the jig fixtures on jig table 144. Pneumatic line supports (not shown) between air source 366 and the air manifold assembly 272 are provided to prevent the line from being entangled by the reciprocal movement of the jig table 144.

The preferred manner of operating apparatus 20 is to operate all of the press head assemblies which are to be used for a given truss simultaneously. In this way the connector plates can be pressed into the component ends at the same time for a high productivity rate.

As an illustration of the operation of apparatus 20 a monopitch truss can be assembled on the jig table 144 in the position as shown in FIG. 7. A series of connector plates illustrated as plates 368 and 370 are placed in positions adjacent to pneumatic clamps 256 and 258, respectively, over the truss component ends at which joints are required. The seven press trucks with the two press head assemblies on each of the trucks are then adjusted to have the required positions for the six vertical truss component members together with the end joint held in place by pneumatic clamp 264. Only a single press head is required on the press truck located at the furthest most righthand position.

The pneumatic clamps 252–264 are engaged in order to press the truss components into the required relationship immediately prior to placement of the connector plates onto the joint positions. Also connector plates for the bottom of each of the joints are prearranged on the base reaction pads for each of the jig fixtures. The arrangement of the truss components, placement of the required connector plates, and adjustment of the truss components all occur on the jig table as supported by the jig base 88 as shown in FIGS. 2 and 3. This is a convenient work table top arrangement for this layout work.

Upon completion of the jig fixture layout work the switch and valving remote control panel 365 is operated whereby hydraulic power from power supply 274 operates through hydraulic device 363 to supply fluid power to hydraulic motor 150 shown in FIGS. 4 and 10 for moving the slidable jig table 144 under the press assembly 280. The bottom plate 70 will then lie immediately below the jig table 144. The sliding movement of jig table 144 is caused by operation of hydraulic motor 150 which in turn operates drive gear 162 and the drive gear 170 attached to opposite ends of drive shaft 158. The attachment of the ends of the sprocket chain 164 to the studs 176 and 178 permits movement into and out of the press area in a convenient and automated manner. When the jig table 144 with the pressed monopitch truss components is in place under the press assembly 280 the remote control switches for activation of the upper platens are engaged and the upper platens then simultaneously descend to contact the connector plates at the required positions in order to form the truss joints quickly and efficiently. Upon completion of the pressing operation the remote control switching for operation of hydraulic motor 150 in the reverse direction is engaged and the jig table 144 together with the completed truss component is then slid out from under the gantry bridge 38. Upon release of the pneumatic clamps 252–264 the completed building truss can be removed from jig table 144.

If desired a multiple number of building trusses can be manufactured at the same time by stacking several layers of connector plates and components on the jig table 144 with reaction pads between each vertical set of connector plates and components. Such a stacked production schedule results in somewhat higher efficiency of pressing time but requires longer set up time. Due to the high productivity automated nature of the operation of apparatus 20 it is preferable to manufacture building truss one at a time.

Automated Operations

If desired apparatus 20 can be fitted with limit switches so that upon engagement of hydraulic motor 150 the jig table 144 will slide under the gantry bridge 38 and engage a limit switch which will then cause the press assembly 280 to engage and for the top platens to then press in the connector plates. Other limit switches can be instrumented in one or more of the upper platens to release the hydraulic pressure from the ganged hydraulic cylinders upon completion of the connector plate drive strokes. The guide and stroke limit blocks 346 can also be utilized for this purpose. When the hydraulic cylinders have returned to their solid line upper rest positions as shown in FIG. 5 another limit switch can cause hydraulic motor 150 to reverse its operation to slide the completed building truss out from under the gantry bridge 38. Such automated operations enhance the productivity of apparatus 20 but care must be taken for the provision of adequate safety devices to interrupt the automated operation in the event of malfunctioning or operator error.

The preferred advantageous features of apparatus 20 are the reciprocal movement of the jig table from an assembly positioned to a press assembly and return of the same and the x-y coordinate adjustability of the press assembly upper platens. These two features result in higher productivity and lower per unit production costs for the fabrication of building components. The simultaneous operation of the press head assemblies is also regarded as commercially useful advantage of apparatus 20.

The x- and y-axes coordinate arrangement of the press head assemblies in press assembly 280 also entails another advantageous structural arrangement in that the hydraulic cylinders for the various press heads are distributed throughout the area of assembly 280. This distribution also results in the reaction forces being applied to the frame tubes and channels of apparatus 20 in a manner to minimize the deflection of the gantry bridge 38.

Connector plates of about 12 inches×12 inches area require about 1000 lb./square inch of pressing force. The hydraulic cylinders 324 must then be rated for at least 6 tons to press in the connector plates. The distribution of the required reaction forces throughout gantry bridge 38 causes only minimal deflection of the channel members due to cancellation of the transverse force vectors from one side of the gantry bridge by opposite force vectors in the other side.

The use of single head presses in the prior art fabrication apparatuses has required very heavy frame constructions to hold the force deflections within acceptable limits. The distributed reaction force arrangement of apparatus 20 has resulted in a construction and operation advantage.

The monopitch truss 250 illustrated in FIG. 7 is of particular use in mobile home roof construction which is in wide spread commercial use. The jig fixtures of FIG. 7 are therefore a preferred form of the present invention for securing the lumber components in the truss formation prior to fabrication.

The press head assemblies 310 and 312 can also be mounted in separate press trucks whereby each of the heads is individually movable within the x- and y- axis coordinate area. Since most building trusses have lumber components arranged at right angles to a base line two or more of the press heads are preferably arranged on a common press truck. The press head hydraulic cylinders 324 can be operated simultaneously to press in all of the connector plates arranged on a given truss preform at the same time. Alternatively the press heads can be operated selectively in a sequential fashion to press in the connectors in a predetermined order. These types of operational control can be manually accomplished through remote control panel 365 or such operation can be programmed by timer switching gear contained within the panel for automated operation.

The lumber components which are used for the fabrication of building trusses according to the present invention are conventionally 2×4 inch lengths. The connector or nail plates are constructed of steel plates which have a set of nail struck perpendicularly from the main plane as shown in U.S. Pat. Nos. 3,329,328 and 4,104,962 or 4,343,580. The invention may be embodied in other specific forms without departing from the spirit or essential characteristics thereof. The present embodiment are therefore to be considered in all respects is illustrative and not restrictive, the scope of the invention being indicated by the appended claims rather than by the foregoing description, and all changes which come within the meaning and range of equivalency of the claims are therefore intended to be embraced therein.

What is claimed is:

1. A building truss fabrication apparatus comprising:

a jig table having a first position adapted for assembly of a building truss from lumber components and a plurality of connector plates and having a second pressing position within said apparatus, said jig table includes jig fixtures operably affixed thereto for securing assembled truss components into the form desired for a given building truss to be fabricated;

drive means for moving said jig table from said first position to said second position, and a press assembly arranged for pressing a plurality of said connector plates into said components at said second position, said first position being outside the press assembly, said press assembly including a bottom platen arranaged below the press assembly for supporting the jig table in its second position;

wherein said drive means is connected between the jig table and press assembly and immediately below the jig table to impart linear translational movement to the jig table in a common plane between said first and second position; and means for guiding the jig table between said first and second positions, said guiding means including guide slideways arranged between said jig table and press assembly to (1) allow said table to smoothly translate within said common plane, and (2) position said jig table directly above the bottom platen in supporting relationship in said second position.

2. The apparatus according to claim 1, wherein said drive means is adapted to move said jig table from said second pressing position to said first position for removal of a fabricated truss.

3. The fabrication apparatus according to claim 1, wherein said press assembly comprises a plurality of press head assemblies arranged in an x- and y- coordinate space, and said press head assemblies are adapted for adjustment to predetermined locations within said coordinate space.

4. The fabrication apparatus according to claim 3, wherein said press head assemblies are mounted in pairs for movement in an x-axis direction and are mounted individually for movement in a y-axis direction.

5. The fabrication apparatus according to claim 1, wherein a jig base is provided for supporting said jig table at said first position and wherein a gantry bridge work operably retains said press assembly over a pressing space located contiguous to said second position.

6. The fabrication apparatus according to claim 3, wherein said plurality of press head assemblies are adapted for simultaneous press movement to press a plurality of connector plates into the assembled building components.

7. The fabrication apparatus according to claim 3, wherein said plurality of press head assemblies are adapted for selective sequential press movements for pressing selected connector plates into said truss components in a predetermined order.

8. The fabrication apparatus according to claim 5, wherein a series of press trucks are supported by said gantry bridge work and are arranged for movement transversely with respect to said bridge work in an x-axis direction.

9. The fabrication apparatus according to claim 8, wherein at least one press head assembly is supported by each of said press trucks and wherein said press head assembly is adapted for movement in a y-axis direction.

10. The fabrication apparatus according to claim 8, wherein a series of press trucks are supported by said gantry bridge work and are arranged for transverse movement relative thereto in an x-axis direction, and wherein at least two press head assemblies are arranged for movement relative to each of said press trucks for movement in a y-axis direction.

11. The fabrication apparatus according to claim 3, wherein said press head assemblies are adjusted to have positions arranged to coincide with the positions of connector plates on said assembled building truss arranged on said jig table.

12. The fabrication apparatus according to claim 1, wherein said jig fixtures comprise a series of reaction pad assemblies.

13. The fabrication apparatus according to claim 12, wherein said reaction pad assemblies comprise clamping means and positioning means for retaining the assembled truss components into a desired building truss formation.

14. The fabrication apparatus according to claim 1, wherein said drive means comprises a hydraulic motor, and a power transmission means connected between said jig table and said motor.

15. The fabrication apparatus according to claim 14, wherein said power transmission means comprises a drive gear connected to said hydraulic motor and a drive chain operably connected to said drive gear and to said jig table.

16. The fabrication apparatus according to claim 14, wherein said power transmission means comprises a drive shaft operably coupled to said hydraulic motor, a first and a second drive gears affixed to said drive shaft, and power transmitting means operably connected to said two drive gears and to said jig table, said hydraulic motor operable in a first direction to move said jig table from said first position to said second position and operable in the reverse direction to move said jig table from said second to said first position.

17. The fabrication apparatus according to claim 16, wherein said power transmitting means comprises first and second drive chains operably connected to said first and said second driven gears and each having the terminal ends thereof connected to separate positions on said jig table, whereby operation of said hydraulic motor causes said drive chains to move said jig table from said first position to said second position.

18. The fabrication apparatus according to claim 1, comprising a power supply means adapted for supplying hydraulic power to said drive means and to said press assembly.

19. The fabrication apparatus according to claim 13, further comprising a means for supplying fluid power to said clamping means.

20. The fabrication apparatus according to claim 3, wherein said press head assemblies comprise a hydraulic cylinder mounting plate, a retaining means for securing said assembly within said press assembly, a hydraulic cylinder mounted in said mounting plate, a piston rod extending from said hydraulic cylinder and having a guide and stroke limiter block attached thereto, and a compression return spring mounted between said mounting plate and said stroke limiter block to return said piston rod to its initial position after a pressing stroke, and an platen affixed to the end of said piston rod.

21. A fabrication apparatus according to claim 8, wherein said press trucks comprise first and second press truck ends interconnected by at least two bridged channel members, and wherein roller wheels are rotatably connected to said press truck ends and are adapted for supporting said bridged truck within said gantry bridge work.

22. A building truss fabrication apparatus comprising:

(a) a jig table having a first position adapted for assembly of a building truss from lumber components and a plurality of connector plates and having a second pressing position within said apparatus, (b) drive means for moving said jig table from said first position to said second position, and (c) a press assembly arranged for pressing a plurality of said connector plates into said components at said second position, said first position being outside the press assembly, further including a jig base provided for supporting the jig table at the first position and wherein a gantry bridge work operably retains said press assembly over a pressing space located contiguous to said first position, wherein a series of press trucks are supported by said gantry bridge work and are arranged for movement transversely with respect to said bridge work in an x direction, wherein said press trucks comprise first and second press truck ends interconnected by at least two bridged channel members, and wherein roller wheels are rotatably connected to said press truck ends and are adapted for supporting said bridged truck within said gantry bridge work, and wherein said press assembly includes press head assemblies comprising a hydraulic cylinder mounting plate, a retaining means for securing said assembly withing said press assembly, a hydraulic cylinder mounted in said mounting plate, a piston rod extending from said hydraulic cylinder and having a guide and stroke limiter block attached thereto, said hydraulic cylinder extending within a space formed between said at least two bridged channel members stably resisting reaction forces applied thereto upon actuation of the cylinder causing the platen to descend into driving contact with a connector plate during the pressing stroke of the piston rod.

* * * * *